United States Patent [19]

Bowler et al.

[11] 3,718,375
[45] Feb. 27, 1973

[54] HYDRAULIC ANTI-LOCK BRAKE CONTROL SYSTEM

[75] Inventors: Laurence L. Bowler, Bloomfield Hills; John L. Harned, Grosse Pointe Woods, both of Mich.

[73] Assignee: General Motors Corporation, Detroit, Mich.

[22] Filed: Sept. 30, 1971

[21] Appl. No.: 185,087

[52] U.S. Cl. ............303/21 B, 188/181 C, 303/21 F
[51] Int. Cl. .................................................B60t 8/06
[58] Field of Search ...303/21 P, 21 B, 21 BE, 21 BB, 303/21 EB, 21 C, 21 CG, 21 F; 188/181 A, 181 C

[56] References Cited

UNITED STATES PATENTS

| | | | |
|---|---|---|---|
| 2,869,687 | 1/1959 | Keim et al. | 303/21 BB |
| 2,975,003 | 3/1961 | Sandor | 303/21 B |
| 3,264,039 | 8/1966 | Cadiou | 303/21 BB X |
| 3,269,781 | 8/1966 | Van House | 303/21 BB X |

*Primary Examiner*—Milton Buchler
*Assistant Examiner*—John J. McLaughlin
*Attorney*—W. E. Finken et al.

[57] ABSTRACT

A vehicle brake system includes a master cylinder, a regulating valve which modulates pump generated fluid pressure to provide a regulated pressure proportional to the master cylinder pressure, and a hydraulic actuator which provides a brake pressure proportional to the regulated pressure. The wheel slip condition is sensed by a transmission governor providing a wheel speed proportional pressure and a vehicle ground speed computer providing a vehicle ground speed proportional pressure. A control logic circuit including a hysteresis switching valve, a bypass valve, and a ball check valve functions to modify the regulated pressure in accordance with the difference between wheel speed pressure and vehicle ground speed pressure causing the hydraulic actuator to vary the wheel slip to continuously seek out the peak value of wheel-to-road friction coefficient.

3 Claims, 3 Drawing Figures

HYDRAULIC ANTI-LOCK BRAKE CONTROL SYSTEM

CROSS REFERENCE TO RELATED APPLICATION

The hydraulic anti-lock brake control system of this invention is used in conjunction with the hydraulic vehicle ground speed computer claimed in copending patent application Ser. No. 185,086, filed Sept. 30, 1971 assigned to the common assignee.

BACKGROUND OF THE INVENTION

The invention relates to an improved anti-lock brake control system and more particularly to a hydraulic brake control system which is overridden by an all-hydraulic wheel condition sensing and control logic circuit to control wheel slip.

It is well known that the friction coefficient between a vehicle tire and the road surface decreases rapidly when the brake torque generated by an excessive brake pedal actuation causes the vehicle wheel to depart from the free rolling condition and approach the locked wheel condition in which the wheel slides on the road surface. Such a decrease in friction coefficient as excessive braking causes an increase in wheel slip may be evidenced by impaired vehicle directional stability. It is therefore advantageous to control the brake pressure so as to maintain wheel slip within limits which provide a high average wheel-to-road coefficient.

SUMMARY OF THE INVENTION

The vehicle brake system includes a conventional master cylinder which generates a master cylinder pressure proportional to the actuating force applied thereto. A regulating valve modulates transmission line pressure to provide a regulated pressure which is directly proportional to the master cylinder pressure. The regulated pressure is communicated to a hydraulic actuator which generates a brake pressure directly proportional to the regulated pressure. The brake pressure is then communicated to the wheel brake or brakes.

The all-hydraulic wheel condition sensing and control logic circuit includes a transmission governor which generates a pressure proportional to the wheel speed and a vehicle ground speed computer which provides a pressure proportional to the vehicle speed relative the ground. A control logic circuit including a hysteresis switching valve, a bypass valve and a ball check valve modifies the regulated pressure as a function of the difference existing between the wheel speed pressure and the vehicle ground speed pressure and functions to operate the hydraulic actuator so as to vary the wheel slip to continuously seek out the peak value of wheel-to-road friction coefficient.

THE BRAKE APPLY SYSTEM

Figure 1A:
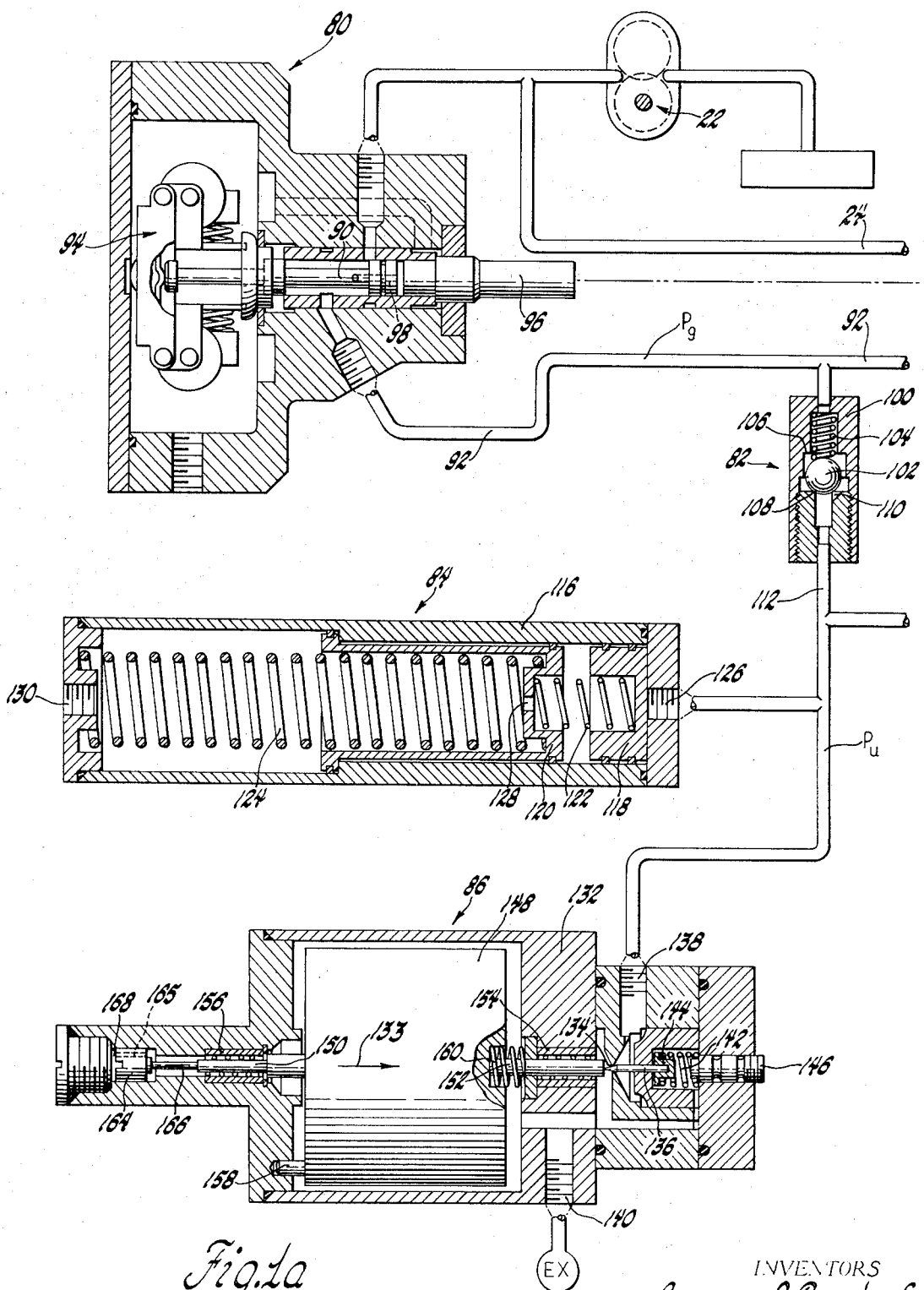
FIG. 1a illustrates the transmission governor and the vehicle ground speed computer having parts broken away and in section.
Figure 1B:
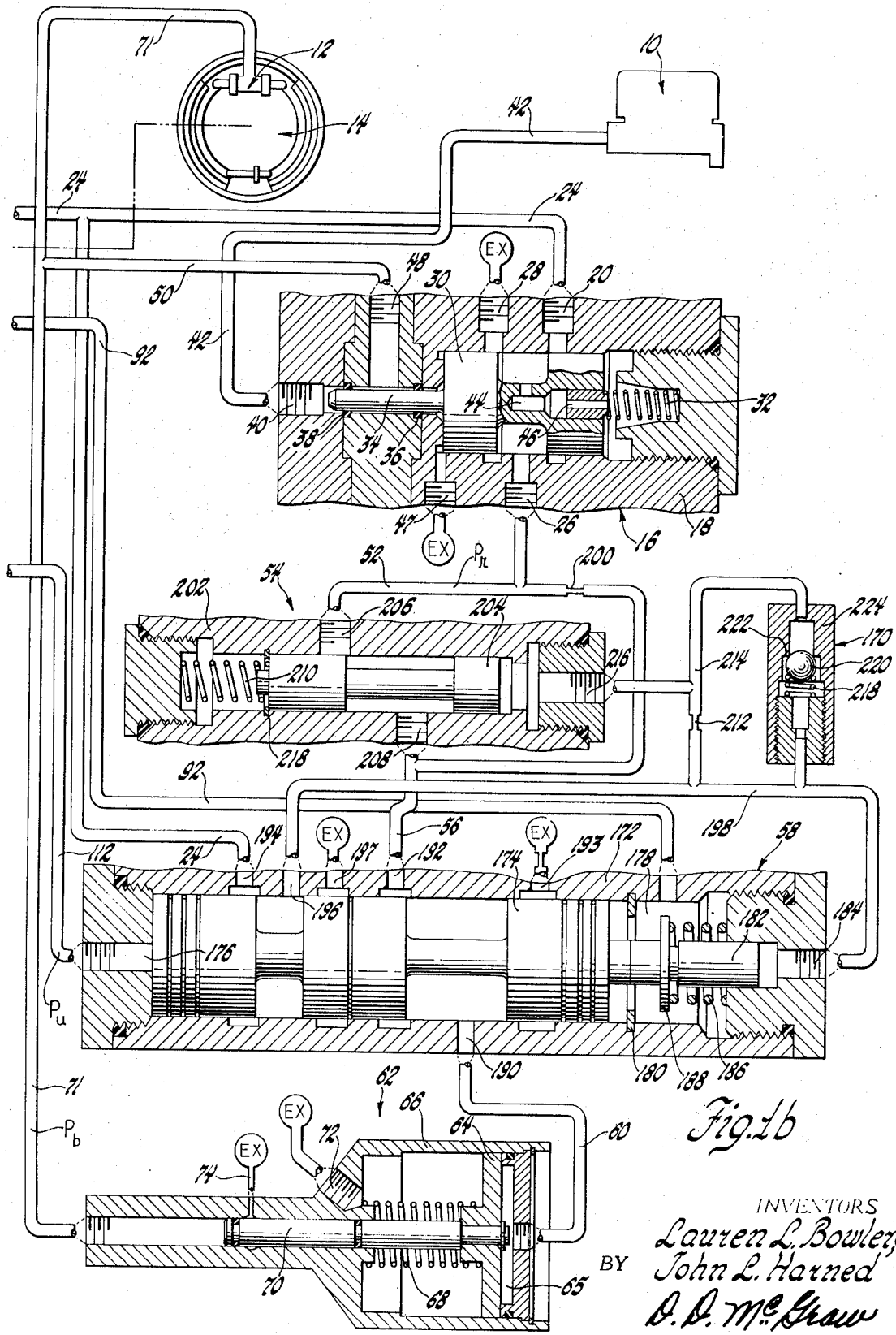
FIG. 1b illustrates the all-hydraulic anti-lock brake control system having parts broken away and in section.

Referring to the composite of FIGS. 1a and 1b, it can be seen that the brake system includes a conventional operator actuated master cylinder 10 which generates a master cylinder pressure and a conventional wheel brake 12 which imparts a braking torque to the wheel 14 in proportion to the brake pressure acting thereon.

A regulating valve 16 acts as a servo valve to modulate transmission line pressure and provide a regulated pressure, hereinafter referred to as $P_r$, which is directly proportional to the master cylinder pressure. The regulating valve 16 includes a housing 18 having an inlet port 20 connected to the transmission pump 22 or an equivalent hydraulic power source by a conduit 24, a $P_r$ outlet port 26, and an exhaust port 28. The valve spool 30 is slidable in housing 18 between positions connecting the $P_r$ outlet port 26 with either the inlet port 20 or the exhaust port 28. A spring 32 acts between housing 18 and spool 30 to urge spool 30 to its normal position as shown in FIG. 1b wherein $P_r$ outlet port 26 is communicated to the exhaust port 28 whereby $P_r$ equals zero. An extension 34 is formed on the left end of spool 30 and extends through spaced seals 36 and 38 into communication with inlet port 40. Master cylinder pressure is communicated through conduit 42 to the inlet port 40 where it acts on extension 34 urging spool 30 rightwardly to close exhaust port 28 and open inlet port 20, thereby causing $P_r$ to increase. $P_r$ is communicated through passage 44 and orifice 46 to the rightward end of spool 30 causing the regulator valve 16 to act as a servo valve maintaining $P_r$ directly proportional to master cylinder pressure. The ratio of master cylinder pressure to $P_r$ is determined by the ratio of the spool 30 end areas acted upon by the respective pressures. Fluid leakage past spool 30 or seal 36 is vented through exhaust port 47.

The regulating valve 16 also functions to communicate master cylinder pressure directly to the wheel brake 12 when the transmission pump is not operating or when a malfunction results in a loss of transmission line pressure during vehicle operation. An outlet port 48 is provided intermediate seals 36 and 38 and is connected to the wheel brake 12 by conduit 50. In the absence of transmission line pressure communicated to inlet port 20, a $P_r$ cannot be generated and so the master cylinder pressure acting on extension 34 of spool 30 is resisted only by the force of spring 32. Spool 30 is moved fully rightwardly withdrawing the end of extension 34 past seal 38 and connecting inlet port 40 with outlet port 48 so that $P_m$ is communicated directly to the wheel brake 12. When the master cylinder pressure is relieved, spring 32 returns spool 30 leftwardly forcing extension 34 through seal 38.

The regulated pressure $P_r$ provided by the regulating valve 16 is communicated through conduit 52, bypass valve 54, conduit 56, hysteresis switching valve 58 and conduit 60 to the hydraulic actuator 62. A description of bypass valve 54 and hysteresis switching valve 58 will follow, it being sufficient at this point to note that these valves provide an unrestricted flow path from $P_r$ outlet port 26 of regulating valve 16 to the hydraulic actuator 62 when the brakes are applied at normal levels.

The hydraulic actuator 62 serves as a hydraulic ram which generates a brake pressure, hereinafter referred to as $P_b$, in proportion to the $P_r$ acting thereon. The hydraulic actuator 62 includes a piston 64 which is sealingly movable in housing 66 and forms therewith a chamber 65 to which conduit 60 communicates $P_r$. A piston rod 70 attached to piston 64 is sealingly slidable in housing 66 and forms a movable wall of $P_b$ conduit 71 which is connected to wheel brake 12. A spring 68 is seated on housing 66 and urges the pistons to the rest position shown in FIG. 1b when $P_r$ equals zero. The ratio of $P_b$ to $P_r$ is determined by the ratio of end areas of piston rod 70 and piston 64. Leakage of $P_c$ past piston 64 and leakage of $P_b$ past piston rod 70 is respectively exhausted through exhaust ports 72 and 74. Thus, it can be seen that the regulating valve 16 and the hydraulic actuator 62 cooperate to provide a brake pressure $P_b$ which is directly proportional to the master cylinder pressure. Furthermore, the brake pressure can be made to equal the master cylinder pressure by providing equal end area ratios in the regulating valve 16 and the hydraulic actuator 62.

THE WHEEL CONDITION SENSING CIRCUIT

The wheel condition sensing function is performed by the transmission governor and the hydraulic vehicle ground speed computer. Referring to FIG. 1a, the wheel condition sensing circuit includes generally a transmission governor 80 which provides a fluid pressure proportional to the wheel speed and a vehicle ground speed computer including a check valve 82, an accumulator 84, and a decelerometer actuated valve 86 which cooperate to provide a fluid pressure proportional to the vehicle speed relative to ground. The wheel speed proportional pressure is hereinafter referred to as $P_g$ and the vehicle ground speed pressure as $P_u$.

The transmission governor 80 includes a valve spool 90 which communicates pressure from the transmission pump 22 to $P_g$ conduit 92 in proportion to the unbalance forces acting thereon. A flyball assembly, generally indicated at 94, is driven by an input shaft 96 suitably connected to the wheel 14 and generates a force acting rightwardly on the valve spool 90 in proportion to the square of the wheel velocity. An orifice 98 in the valve spool communicates $P_g$ to the right end of the valve spool 90 providing a leftward acting pressure force which opposes the flyball generated force. Thus, the governor continually responds to keep valve spool 90 in equilibrium, producing a $P_g$ proportional to the square of the governor's angular speed. The flyball assembly 94 includes primary and secondary weights which function to provide a two-stage pressure versus speed characteristic.

Check valve 82 of the ground speed computer includes a housing 100 in which a ball valve 102 is located. A spring 104 seated at housing 100 engages ball valve 102 urging it away from a seat 106 and into engagement with abutment 108. Fluid passages 110 communicate fluid past ball valve 102 when it is seated at abutment 108 so that the conduits 92 and 112 are connected. When the speed of the wheel 14 decreases and consequently $P_g$ decreases, the resultant flow from conduit 112 to conduit 92 will overcome spring 104 and seat ball valve 102 at valve seat 106. Spring 104 is sized to be compressed when the flow rate is such as to indicate a certain predetermined rate of wheel deceleration, for example, 32.2 feet per second squared or 1G.

Accumulator 84 includes a housing 116 in which pistons 118 and 120 are slidable. Variable rate springs 122 and 124, of helical variable pitch design, act respectively between pistons 118 and 124 and between piston 120 and housing 116. Springs 122 and 124 function to provide a two-stage construction which produces a nonlinear relationship between the position of piston 118 and the accumulator pressure so that a pressure versus speed curve equivalent to that of the governor 80 is generated. Spring 124 is preloaded and spring 122 is at free length when the respective pistons are positioned as shown in FIG. 1a. Communication of $P_g$ through conduit 112 to inlet port 126 of accumulator 84 first moves piston 118 leftwardly compressing variable rate spring 122 until piston 118 engages piston 120. A further increase in $P_g$ urges pistons 118 and 120 unitarily leftward compressing the variable rate spring 124. Any fluid leakage past the seals of piston 118 is exhausted through hole 128 and exhaust port 130.

The decelerometer actuated valve 86 functions to exhaust pressure from accumulator 84 at a controlled rate which is proportional to the vehicle linear deceleration. A housing 132 forms a sharp edged hole 134 which in cooperation with a tapered needle 136 produces a flow restriction between an exhaust port 140 and a valve inlet port 138 which is connected to conduit 112. Tapered needle 136 is urged in a flow restricting direction relative to the sharp edged hole 134 by a spring 142 which engages the tapered needle 136 through the intermediary of cap 144. The preload of spring 142 is adjustable by virtue of its being seated on a pin 146 which threadedly engages housing 132. A sensor mass 148 includes pins 150 and 152 which are respectively supported on ball bushings 154 and 156. A pin 158 attached to the sensor weight 148 extends into a hole in housing 132 to prevent rotation of the sensor mass 148. The pins 150 and 152 are aligned with the vehicle longitudinal axis and the ball bushings 154 and 156 allow the sensor mass to move in this single degree of freedom. The end of pin 152 engages the tapered end of the tapered needle 136 so that movement of the sensor mass 148 adjusts the position of tapered needle 136 and thus the flow through the sharp-edged hole 134. A spring 160 acting between housing 132 and sensor mass 148 resists inertia induced movement of sensor mass 148 in the direction of arrow 133 which indicates the direction of forward vehicle movement. A piston 164 having an orifice 165 is attached to pin 150 by a rod 166 and operates in a closed chamber 168 to provide damping of sensor mass 148 which prevents undesired oscillations. The flow area between needle 136 and the sharp-edged hole 134 varies nearly linearly with the inertia force acting on sensor mass 148. It is noted that selection and adjustment of springs 142 and 160 can be made to provide a $P_u$ in conduit 112 which changes at a rate equal to, less than, or greater than a corresponding change in vehicle ground speed.

In operation the pressure $P_u$ in the accumulator 84 is equal to $P_g$ when the vehicle wheels are either decelerating at normal rates or accelerating. When the pressure differences across check valve 82 is indicative of a wheel deceleration in excess of 1G or some other predetermined level, ball valve 102 is seated to isolate conduit 112 from conduit 92. The decelerometer actuated valve 86 exhausts the pressure in accumulator 84, $P_u$, at a controlled rate proportional to the vehicle linear deceleration. The springs 122 and 124 of the accumulator 84 function to provide a pressure versus speed characteristic equivalent to that of the governor 80. Thus, the cooperation of the check valve 82, accumulator 84, and the decelerometer actuated valve 86 provides a pressure $P_u$ in conduit 112 which is proportional to the vehicle ground speed. It is noted that since $P_g$ is proportional to the wheel speed and $P_u$ is proportional to the vehicle speed, the difference between $P_u$ and $P_g$ is proportional to the wheel slip. When $P_u$ equals $P_g$, as is the case when the vehicle wheels are either decelerating at normal rates or accelerating, there is no wheel slip. Then an excessive braking pressure is applied to the wheel brake 12 causing the wheel to decelerate faster than the vehicle, the pressure difference between $P_u$ and $P_g$ is proportional to the amount of wheel slip.

THE ANTI-LOCK CONTROL LOGIC CIRCUIT

A hydraulic logic control circuit including the hysteresis of switching valve 58, the bypass valve 54, and a check valve 170 modify the level of $P_r$ communicated to actuator 62 whenever the pressure difference between $P_u$ and $P_g$ is indicative of impending wheel lockup. The control circuit is based on the extremal control principle and operates to continuously seek the peak of the wheel-to-road friction coefficient curve.

The hysteresis switching valve 58 functions to modulate $P_r$ and produce a switching pressure, hereinafter referred to as $P_s$. The hysteresis switching valve 58 includes a housing 172 in which a valve spool 174 is slidable. The vehicle ground speed reference pressure $P_u$ in conduit 112 is received at chamber 176 at the leftward end of spool 174. The wheel speed pressure $P_g$ in conduit 92 is received in chamber 178 at the rightward end of valve spool 174. Valve spool 174 is shiftable from a leftwardmost position engaging housing 172 to a rightwardmost position engaging stop ring 180 which is seated in the housing 172. A piston 182 is also slidable in housing 172, forming therewith a chamber 184 and extending through chamber 178 and into engagement with the rightward end of spool 174. A spring 186 engages a shoulder 188 formed on piston 182 urging the piston 182 into engagement with spool 174 and in turn urging the spool 174 to its full leftward or rest position engaging housing 172. This position of spool 174 corresponds to non-braking or normal braking of the vehicle when $P_u$ equals $P_g$. When spool 174 is in this rest position, an inlet port 192 connected to conduit 56 is communicated to outlet port 190 and through conduit 60 to chamber 65 of the hydraulic actuator 62. Furthermore, an inlet port 194 connected to the transmission line pressure conduit 24 is communicated to $P_s$ outlet port 196. Movement of spool 174 to the rightward position engaging stop ring 180 blocks inlet ports 192 and 194 and opens communication of outlet ports 190 and 196 to the respective exhaust ports 193 and 197. Conduit 198 connects $P_s$ outlet port 196 with the chamber 184 and communicates the resulting switching pressure $P_s$, to chamber 184 where it acts on piston 182 to provide a leftward acting force on spool 174. Thus, it can be seen that during normal driving when $P_u$ equals $P_g$ the valve spool 174 is held in the leftwardmost position as shown in FIG. 1 b by the combined force of spring 186 and pressure force of $P_s$ acting on piston 182, thereby providing an unrestricted flow path between conduits 56 and 60 through the hysteresis switching valve 58.

The bypass valve 54 and an orifice 200 provide parallel $P_r$ flow paths between $P_r$ outlet port 26 of the regulating valve 16 and the inlet port 192 of the hysteresis switching valve 58. The bypass valve 54 includes a housing 202 in which a valve spool 204 is slidable to selectively permit or block fluid communication between an inlet port 206 connected to $P_r$ outlet port 26 by a conduit 52 and an outlet port 208 connected by conduit 56 to the hysteresis switching valve inlet port 192. A spring 210 acts between housing 202 and spool 204 and urges spool 204 to block communication between inlet port 206 and outlet port 208. $P_s$ in conduit 198 is communicated through orifice 212 and conduit 214 to the chamber 216 at the rightward end of spool 204 where $P_s$ acts on spool 204 urging it leftwardly against the force of spring 210 and into engagement with stop ring 218 seated in housing 202. FIG. 1b shows the normal position of spool 204 corresponding to normal braking levels wherein an unrestricted $P_r$ flow path between conduits 52 and 56 is provided through bypass valve 54.

The check valve 170 includes a spring 218 which urges ball valve 220 to a normal position engaging valve seat 222 formed on housing 224. It can be seen that check valve 170 functions to bypass orifice 212 by directly connecting conduits 214 and 198 when $P_s$ is rapidly decreased upon communication of inlet port 196 with exhaust port 197.

ANTI-LOCK OPERATION

Figure 2:
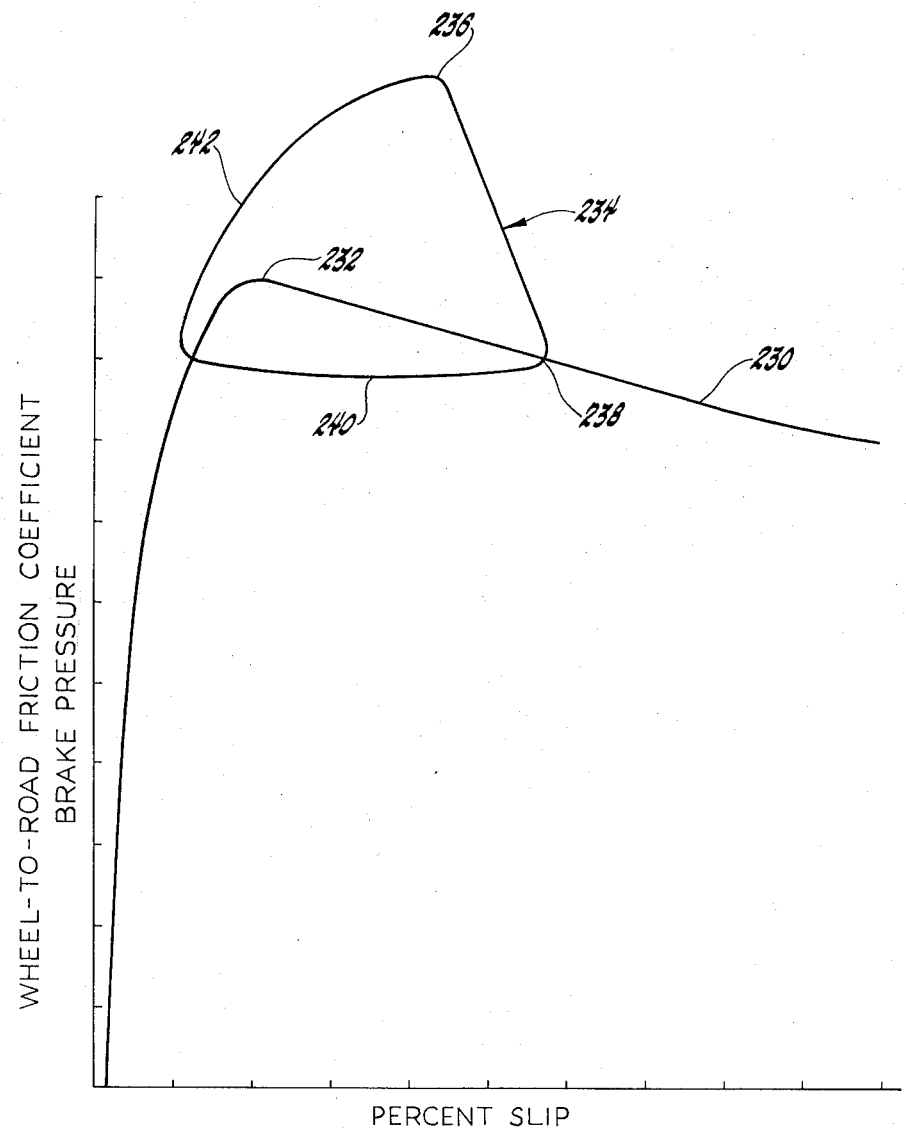
FIG. 2 is a plot of wheel-to-road friction coefficient and brake pressure against percent slip.

During the following explanation of the operation of the structure embodying the invention, reference will be made to the plot of wheel-to-road friction coefficient and brake pressure against percent slip shown in FIG. 2. Curve 230 of FIG. 2 represents the wheel-to-road friction coefficient available at various wheel slip percentages. It can be seen that the maximum coefficient and thus the maximum braking effectiveness is obtained at a wheel slip corresponding to point 232, the peak of curve 230. The closed loop 234 plots the brake pressure provided by the hydraulic circuit during periods of anti-lock operation against the percent slip.

When the brakes are applied at a level not in excess of that brake torque which the wheel-to-road friction coefficient can sustain, the pressure $P_r$ generated by regulating valve 16 is unrestrictedly communicated through bypass valve 54 and hysteresis switching valve 58 to the hydraulic actuator 62. The hydraulic actuator 62 provides a brake pressure which is directly proportional to the magnitude of $P_r$.

When an excessive pedal actuating force is applied to master cylinder 10, the brake control system generates a brake torque in excess of that which the wheel-to-road friction coefficient can sustain. Thus, the wheel 14 decelerates faster than the vehicle causing $P_g$ to fall below $P_u$. At a preselected pressure differential between $P_u$ and $P_g$, or in other words, at a predetermined wheel slip, the $P_u$ pressure force acting on spool 174 of hysteresis switching valve 58 exceeds the combined opposing $P_g$ and $P_s$ pressure forces and the force of spring 186 acting thereon. The resulting rightward movement of spool 174 blocks inlet port 192 and connects outlet port 190 with exhaust orifice 193. Referring to FIG. 2, the wheel slip at which this shifting of spool 174 occurs corresponds with point 236 of curve 234. Pressure in chamber 65 of actuator 62 is exhausted at a controlled rate through exhaust orifice 193 causing the brake pressure to decrease proportionally. With spool 174 against stop 180, $P_s$ outlet port 196 is communicated to exhaust port 197 so that $P_s$ rapidly drops to zero. $P_s$ in chamber 216 of bypass valve 54 is rapidly exhausted through the check valve 170 and exhaust port 197, thus permitting spring 210 to shift spool 204 rightwardly blocking communication of $P_r$ through the bypass valve 54. $P_s$ in chamber 184 of hysteresis switching valve 58 is also exhausted.

When the exhausting of actuator chamber 65 through exhaust orifice 193 has decreased $P_b$ to a value where the tire torque permitted by the wheel-to-road friction coefficient slightly exceeds the brake torque generated by $P_b$, the wheel is accelerated causing the wheel speed and thus $P_g$ to increase. Referring to FIG. 2, this wheel speed recovery period begins at a point 238 of curve 234, and it can be seen that the wheel slip decreases as wheel speed increases along portion 240 of the curve 234. The internal adjustment of decelerometer actuated valve 86 is set to provide a $P_u$ rate of decrease which is greater than the corresponding vehicle velocity decrease so that $P_u$ falls slightly below the equivalent vehicle ground speed. When the increasing $P_g$ equals the decreasing $P_u$, spool 174 is pressure balanced and spring 186 moves spool 174 leftwardly away from stop 180. Since wheel speed recovers rapidly in the vicinity of the peak wheel-to-road friction coefficient, the wheel slip usually reaches a minimum value by the time that spool 174 has moved fully leftwardly. This minimum value of wheel slip reached during the wheel speed recovery corresponds to a wheel speed very close to the vehicle ground speed. When $P_g$ equals $P_u$, the check valve 82 is opened, thereby allowing the vehicle ground speed computer to be reset to a pressure close to the corresponding vehicle ground speed pressure.

When in the full leftward position, spool 174 permits communication of $P_r$ through orifice 200 to chamber 65 of the hydraulic actuator 62. Thus, the rate of increase of brake pressure along portion 242 of curve 234 is controlled by the orifice 200. The leftward position of spool 174 also communicates transmission line pressure at inlet port 194 to the $P_s$ outlet port 196 and chamber 184 connected thereto. $P_s$ in chamber 184 acts on piston 182 to provide a pressure force on spool 174 holding it in the leftward position. $P_s$ is also communicated through orifice 212 to chamber 216 of the bypass valve 54. The orifice 212 provides a large restriction so that the pressure force acting on spool 214 cannot increase appreciably during the period that $P_b$ is increasing. As the brake pressure increases, the peak 232 of wheel-to-road friction coefficient is again exceeded and at point 236 the threshold of valve hysteresis switching valve 58 is again exceeded and the peak seeking anti-lock operation sequence is begun anew. The hydraulic anti-lock control logic oscillates in a stable limit cycle mode periodically switching the chamber 65 pressure from an increasing rate to decreasing rate to continuously seek out the peak value of wheel-to-road friction coefficient. During this repeated cycle of operation the bypass valve 54 remains closed so that orifice 200 controls the rate of brake pressure increase. The anti-lock cycle is continued until the vehicle is stopped or the vehicle operator acts to relieve that portion of the brake actuating force which exceeds the torque sustaining capability of the road surface.

What is claimed is:

1. A vehicle brake control system effective to vary the wheel speed during high level braking to control wheel slip and comprising:

a fluid pressure operated wheel brake adapted to provide a braking torque in proportion to the brake pressure acting thereon;

means providing a fluid pressure proportional to the speed of at least one vehicle wheel;

a vehicle ground speed computer providing a fluid pressure proportional to the vehicle ground speed;

pump means providing a continuous flow of pressurized operating fluid;

a master cylinder actuated by the vehicle operator and generating a master cylinder pressure;

regulating valve means acting to modulate pressurized operating fluid to provide a regulated pressure directly proportional to the master cylinder pressure;

actuator means including a piston having one end in uninterrupted brake fluid communication with the wheel brake and the other end in fluid communication with the regulated pressure and being effective to provide a brake pressure proportional to the regulated pressure;

and anti-lock valve means including a hysteresis switching valve means located fluidly intermediate the regulating valve and the actuator means and effective to vary the regulated pressure in accordance with the pressure differential between the wheel speed proportional pressure and the vehicle ground speed proportional pressure to control wheel slip.

2. The system of claim 1, said anti-lock valve means being further characterized by:

said hysteresis switching valve means including a housing, a first inlet port connected to the pump means, a second inlet port at least limitedly receiving regulated pressure, a switching pressure outlet port, a second outlet port fluidly connected to the other end of the actuator, a first exhaust port, a second exhaust port including an orifice, a valve spool slidable in the housing, spring means urging the spool to a normal position communicating the switching pressure outlet port to the first inlet port and the second outlet port to the second inlet port, means introducing wheel speed and vehicle ground speed pressures into the housing to act on opposing ends of the valve spool, a piston slidable in the housing and engaging the valve spool, means communicating switching pressure to the piston to provide a holding force on the spool in aid of the spring means and the wheel speed pressure, the valve spool shifting from the normal position at a predetermined differential between the wheel speed and ground speed pressures to exhaust the switching pressure and the pressure from the actuator, the spool shifting to the normal position when wheel speed pressure equals ground speed pressure to increase the pressure at the actuator and the switching pressure;

bypass valve means including a housing, an inlet port receiving regulated pressure, an outlet port connected to the second inlet port of the hysteresis switching valve, a bypass valve spool slidable in the housing, means urging the bypass valve spool to block fluid communication between the inlet and outlet ports, means communicating switching pressure to the bypass valve spool to hold the bypass valve spool in a normal position permitting unrestricted communication of regulated pressure from the regulating valve to the hysteresis switching valve means;

the means communicating switching pressure to the bypass valve means including check valve means and first orifice means in parallel flow arrangement unrestrictedly communicating switching pressure from the bypass valve means and limitedly communicating switching pressure to the bypass valve means;

and second orifice means in parallel flow relationship with the bypass valve means restrictedly communicating regulated pressure to the second inlet port of the hysteresis switching valve means when the bypass valve means is closed.

3. The vehicle brake control system of claim 2 further characterized by:

the regulating valve means including a housing, an outlet port, an inlet port connected to the pump means, an exhaust port, a regulating valve spool slidable in the housing and including on one end thereof an extension extending sealingly through axially spaced seals in the housing, a second outlet port in the housing intermediate the axially spaced seals and connected to the wheel brake, spring means urging the regulating valve spool to a rest position communicating the outlet port to the exhaust port, means communicating the master cylinder pressure to the end of the extension urging the regulating valve spool from the rest position to progressively connect the outlet port with the inlet port and block the exhaust port, orifice means communicating the outlet port to the other end of the regulating valve spool to oppose the master cylinder pressure, and upon loss of pump means generated operating fluid pressure the unopposed master cylinder pressure moving the regulating valve spool against the spring means to withdraw the extension past one of the seals whereby the master cylinder pressure is directly communicated to the wheel brake.

* * * * *